United States Patent

Schwarzer et al.

[11] Patent Number: 6,012,783
[45] Date of Patent: Jan. 11, 2000

[54] PROCESS FOR THE TEMPERATURE-DEPENDANT ACTUATION OF AN ADDITIONAL PRESSURE MEDIUM SOURCE IN SLIP-CONTROLLED MOTOR VEHICLE BRAKING SYSTEMS, AND BREAKING SYSTEM FOR THE IMPLEMENTATION OF THIS PROCESS

[75] Inventors: Paul Schwarzer, Kriftel; Thomas Krull, Kronberg; Johannes Graber, Eschborn, all of Germany

[73] Assignee: ITT Manufacturing Enterprises Inc., Wilmington, Del.

[21] Appl. No.: 08/930,793

[22] PCT Filed: Mar. 26, 1996

[86] PCT No.: PCT/EP96/01329

§ 371 Date: Mar. 2, 1998

§ 102(e) Date: Mar. 2, 1998

[87] PCT Pub. No.: WO96/31375

PCT Pub. Date: Oct. 10, 1996

[30] Foreign Application Priority Data

Apr. 7, 1995 [DE] Germany .............................. 195 13 128

[51] Int. Cl.[7] ...................................................... B60T 8/24
[52] U.S. Cl. ...................... 303/140; 303/116.1; 303/191; 303/9
[58] Field of Search ............................ 303/140 R, 191 R, 303/146, 9 R, 116.1 R, 113.2, 155, DIG. 2

[56] References Cited

U.S. PATENT DOCUMENTS

| | | | |
|---|---|---|---|
| 4,477,124 | 10/1984 | Watanabe | 303/191 |
| 5,217,284 | 6/1993 | Willmann | 303/113.2 |
| 5,275,476 | 1/1994 | Maisch | 303/113.2 |
| 5,480,221 | 1/1996 | Morita et al. | 303/116.1 |
| 5,584,543 | 12/1996 | Sawada | 303/191 |
| 5,586,814 | 12/1996 | Steiner | 303/113.2 |
| 5,636,907 | 6/1997 | Okazaki et al. | 303/113.2 |
| 5,694,321 | 12/1997 | Eckert et al. | 303/189 |
| 5,769,509 | 6/1998 | Feigel et al. | 303/3 |

FOREIGN PATENT DOCUMENTS

| | | |
|---|---|---|
| 0459117 | 12/1991 | European Pat. Off. . |
| 0538600 | 4/1993 | European Pat. Off. . |
| 3709189 | 9/1988 | Germany . |
| 3910285 | 10/1990 | Germany . |
| 4003328 | 8/1991 | Germany . |
| 4009303 | 9/1991 | Germany . |
| 4010410 | 10/1991 | Germany . |
| 9102352 | 8/1992 | Germany . |
| 4107978 | 9/1992 | Germany . |
| 4128091 | 2/1993 | Germany . |
| 4241595 | 6/1994 | Germany . |
| 4329140 | 12/1994 | Germany . |
| 4413172 | 3/1995 | Germany . |
| 4425578 | 1/1996 | Germany . |

Primary Examiner—Robert J. Oberleitner
Assistant Examiner—Thomas J. Williams
Attorney, Agent, or Firm—Rader, Fishman & Grauer PLLC

[57] ABSTRACT

Process for temperature-dependent actuation of a supplemental pressure medium source in slippage-controlled motor vehicle braking systems. The invention pertains to a process for operating a slippage-controlled motor vehicle braking system with regulation of driving dynamics. In such systems it has thus far been proposed to turn on supplemental pressure medium sources to support the supply pump when regulation starts, in order to shorten the regulation time. Practical studies have shown that such supplemental sources are, first of all, not needed for each regulation process and, second, cause disruptive noise. The invention thus proposes to turn on the supplemental pressure medium source only in the presence of special situations, such as if the pressure medium is very viscous due to low temperatures. Advantageous refinements are concerned with determination of the temperature.

11 Claims, 1 Drawing Sheet

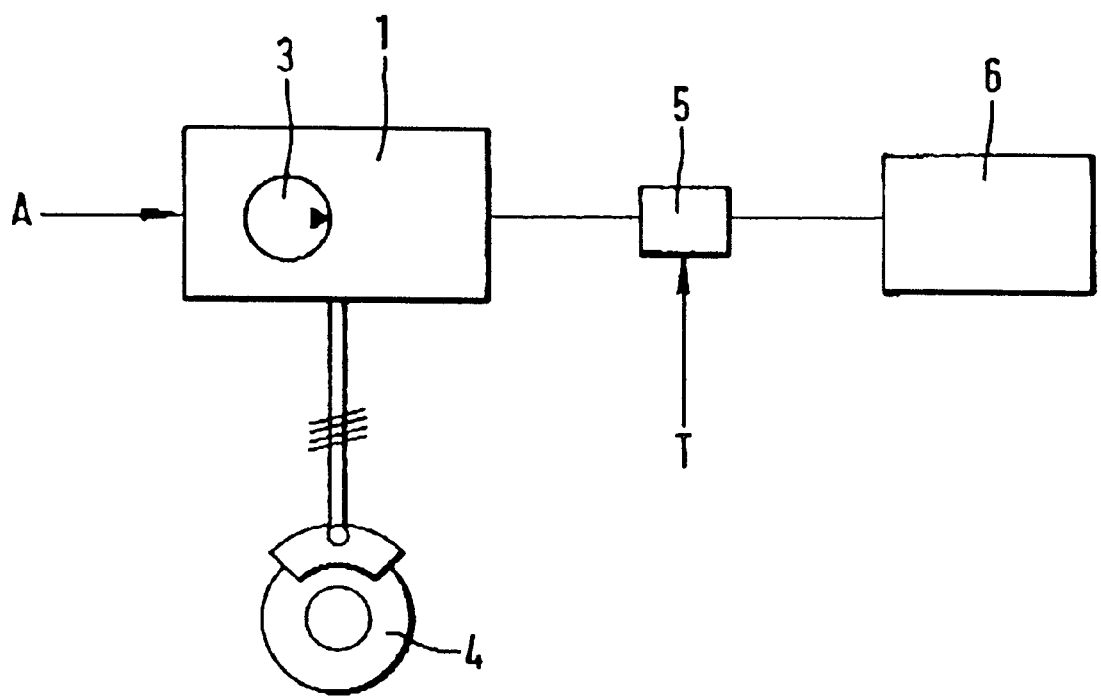

PROCESS FOR THE TEMPERATURE-DEPENDANT ACTUATION OF AN ADDITIONAL PRESSURE MEDIUM SOURCE IN SLIP-CONTROLLED MOTOR VEHICLE BRAKING SYSTEMS, AND BREAKING SYSTEM FOR THE IMPLEMENTATION OF THIS PROCESS

TECHNICAL FIELD

The invention pertains to a process for operating a slippage-controlled motor vehicle braking system for controlling driving dynamics, in which the desired pressure at the motor vehicle brake to be controlled is set.

BACKGROUND OF THE INVENTION

In order to shorten the control time, particularly in case of high viscosity of the pressure medium, it was proposed in P 44 25 578.0 (P 7697) to turn on a supplemental pressure medium source at the beginning of the braking process which quickly makes available the required pressure of the pressure medium. As described in detail in the aforesaid P 44 25 578.0, such a measure offers the great advantage that the response of the regulation at the brakes can be considerably accelerated, even in the case of high viscosity of the pressure medium and thus considerable pressure losses due to the sluggish flow of the pressure medium inside the pressure lines.

It has turned out to be a certain disadvantage, however, that turning on such a supplemental pressure medium source can cause noise that may distract the driver precisely at the moment in time in which he is in a critical driving situation in need of regulation.

The object of the invention is to connect the supplemental pressure medium source to the control loop only if this is actually necessary to accelerate the regulation process.

This object is achieved, according to the invention, by turning on the supplemental pressure medium source as a function of a sufficiently large deviation from the desired value of the regulation parameter for driving dynamics, and a second factor which constitutes a measurement of whether turning on the pressure medium source is necessary for increasing the regulation rate under the environmental conditions. The invention brings the additional advantage that the supplemental pressure medium source is not operated unnecessarily and thus is under less mechanical stress, which contributes to increasing its reliability and service life.

In practice, it has proven particularly reasonable to make the connection of the supplemental pressure medium source dependent on the viscosity of the pressure medium. One parameter affecting the viscosity is the temperature of the pressure medium itself, so that it is advisable as an advantageous refinement of the invention to make connection dependent on the pressure medium temperature.

In order to save on additional sensors for measuring temperatures, the existing engine intake air temperature sensor can be used for estimating the temperature of the pressure medium.

Another possibility of estimating the temperature of the pressure medium consists of measuring wheel and vehicle response times according to the latter principle, the regulation behavior is evaluated for estimating the temperature.

In a preferred embodiment, the supplemental pressure medium source is activated only if the temperature of the pressure medium falls below a pre-determined temperature.

A particularly advantageous refinement of the invention is presented if the connection of the supplemental pressure medium source is made dependent on an additional parameter which corresponds to the gradient of the deviation of the actual value from the desired value of the control parameter. In other words, if the actual value of the driving dynamics parameter, such as the yaw angle velocity, differs only slightly from the desired set value, then it is not necessary for the regulation to take effect abruptly due to turning on the supplemental pressure medium source. Instead, it is then sufficient for the regulation to be operated only with the aid of the supply pump as a pressure medium source. The advantage is that in this way the regulation not only operates rather quietly, but also corrects the driving behavior of the vehicle more gently. This further contributes to the driving comfort of the operator. It is particularly advisable here as a refinement of the invention to make turning on the supplemental source dependent on the gradient of the difference of (one of the) following parameters: the steering angle, the yaw angle or the yaw angle velocity of the vehicle. The invention can also be applied advantageously if, instead of that, the gradient of the difference of the transverse accelerations of the vehicle or of the velocities of the vehicle serves as the criterion for turning on the supplemental pressure medium source.

An additional improvement of the invention can consist in making the additional parameters on which the turning on of the supplemental source depends not dependent or not solely dependent on the gradient of the driving parameter to be regulated, but (additionally) on the temperature. This may be the environmental temperature of the vehicle, but also the temperature of the pressure medium. In this way it is possible, for instance, to turn on the supplemental source for accelerating the regulation only if either the gradient of the deviation of the parameter to be regulated has achieved a certain value or the temperature lies beneath a certain value. Of course, a mixed parameter can be formed here which depends on both values, so that the lower the environmental temperature, the smaller the gradients for turning on the supplemental source. The application of the process according to the invention is practical in particular for a braking system wherein the gradient of the deviation of the actual value of the regulated parameter from that of the set value.

The invention has proven itself very well for a supplemental pressure medium source when the deviation from the yaw angle, transverse acceleration, steering angle, or velocity is monitored because the switching noises of the source are avoided, and the driving comfort during the case when the vehicle must be regulated is increased.

BRIEF DESCRIPTION OF THE DRAWING

FIG. 1 is a schematic of the control system of the present invention. The drawing shows a control loop 1 which is equipped with a supply pump 3 to provide the necessary regulated pressure. As soon as the deviation A of the measured actual value of the regulation parameter from the set value reaches a sufficient magnitude, the supply pump starts up and provides an individual braking pressure to the individual wheel brakes 4 which is appropriate to return the actual value of the regulation parameter to the specified set value.

In FIG. 1, a switch 5 is also illustrated which switches a supplemental source 6 into the control loop 1 as a function of the detected temperature of the pressure medium, so that the pressure necessary for the regulation is made available more quickly and thus the regulation speed is increased.

Details of the mode of functioning of the control loop and the supply pump in conjunction with the wheel brakes and the supplemental source are explained in principle in the above-specified P 44 25 578.0 and should thus not be repeated at this point.

We claim:

1. Process for operating a slippage-controlled motor vehicle braking system with regulation of the driving dynamics having, in addition to a supply pump serving braking pressure regulation in case regulation is required, a supplemental pressure medium source which, temporarily before or in parallel with the supply pump, emits pressure medium under pressure serving for regulating the braking pressure in vehicle brakes, comprising:

means for activating the supplemental pressure medium source as a function of a magnitude of a deviation (A) of an actual value of a regulation parameter from set values, and means for activating the supplemental pressure medium source as a function of the magnitude of an additional parameter (T); and wherein the parameter dependent on the regulation parameter depends on the viscosity of the pressure medium in the braking system.

2. Process according to claim 1 wherein the additional parameter corresponds to the temperature of the pressure medium in the braking system.

3. Process according to claim 2, wherein the air intake temperature of the motor vehicle is measured in order to determine the additional parameter.

4. Process according to claim 2, wherein the pressure detected from the wheel and vehicle reactions before the regulation intervention is compared to the wheel pressure estimated from the regulation model for the pressure on the wheel brake, and the temperature is estimated based on the ascertained deviation of the temperature.

5. Process according to claim 1, wherein the supplemental pressure medium source can be turned on only if the temperature of the pressure medium falls below a specified value.

6. Process according to claim 1, wherein the supplemental pressure medium source is turned on only if the temperature of the pressure medium has a value below 0° C.

7. Process according to claim 1, wherein the additional parameter depends on the gradient of the deviation of the actual value of the regulated parameter from the set value.

8. Process according to claim 7, wherein the additional parameter corresponds to deviation of the yaw angle velocity or the deviation of the transverse acceration or the deviation of the steering angle or the deviation of the velocity.

9. Process according to claim 1, wherein the additional parameter depends both on the gradient of the deviation of the actual value of the regulated parameter and on environmental temperature, specifically, the temperature of the pressure medium.

10. Braking system for performing the process according claim 1, wherein the supplemental pressure medium source is a high-pressure reservoir and/or a braking force booster to be turned on and off preferably by the braking pressure regulation.

11. Braking system according to claim 10, wherein the braking force booster is a pneumatic braking force booster whose output is coupled to the control loop by way of a master cylinder.

* * * * *

UNITED STATES PATENT AND TRADEMARK OFFICE
CERTIFICATE OF CORRECTION

PATENT NO. : 6,012,783
DATED : 01/11/00
INVENTOR(S) : Schwarzer, Paul, Thomas Krull, and Johannes Graber It is certified that error appears in the above-identified patent and that said Letters Patent is hereby corrected as shown below:

On the cover page, on line 5 of the Title, please change "BREAKING" to --BRAKING--.

In column 4, in claim 8, on line 16, please change "acceration" to --acceleration--.

In column 4, in claim 10, on line 24, please insert --to-- after "according".

Signed and Sealed this

Eighth Day of May, 2001

Attest:

NICHOLAS P. GODICI

Attesting Officer

Acting Director of the United States Patent and Trademark Office